Jan. 21, 1964  C. C. HILL  3,118,278
GAS TURBINE POWER PLANT
Filed June 26, 1959  4 Sheets-Sheet 2

INVENTOR.
CHARLES C. HILL
BY
Barnes, Kisselle, Raisch & Choate
ATTORNEYS

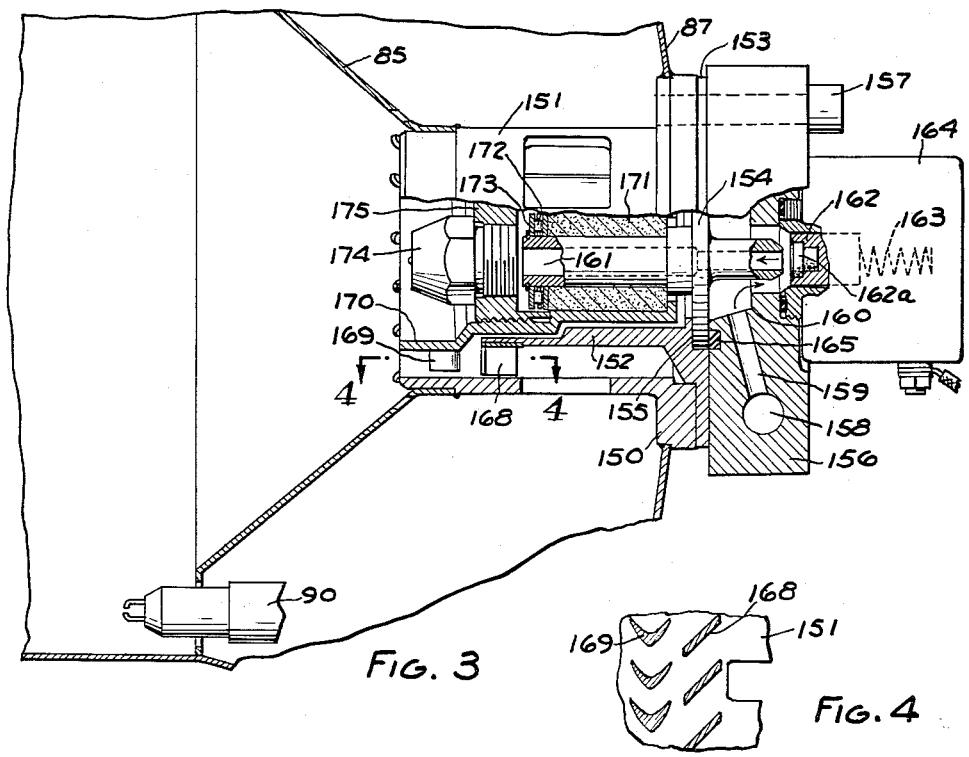
Fig. 3
Fig. 4
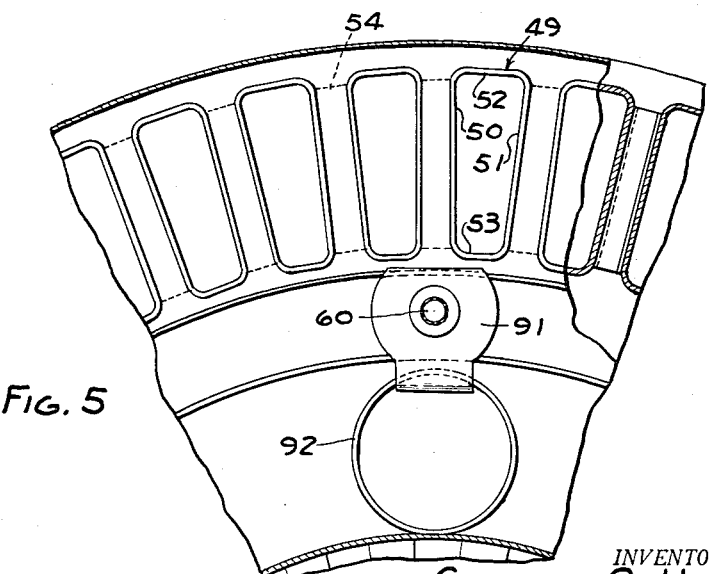
Fig. 5
INVENTOR.
CHARLES C. HILL
BY
Barnes, Kisselle, Raisch & Choate
ATTORNEYS INVENTOR.
CHARLES C. HILL
BY
Barnes, Kisselle, Raisch & Choate
ATTORNEYS United States Patent Office 3,118,278
Patented Jan. 21, 1964

3,118,278
GAS TURBINE POWER PLANT
Charles C. Hill, 1148 Vesper, Ann Arbor, Mich.
Filed June 26, 1959, Ser. No. 823,197
12 Claims. (Cl. 60—39.36)

This invention relates to gas turbine power plants.

It is an object of the invention to provide a gas turbine power plant which is light in weight, compact and efficient.

It is a further object of the invention to provide such a power plant which can be easily manufactured at relatively low cost as compared to the cost of prior gas turbine power plants.

It is a further object of the invention to provide a gas turbine power plant which includes novel structure for maintaining concentricity between associated parts thereof.

It is a further object of the invention to provide such a gas turbine power plant having a novel burner construction which eliminates the formation of hot spots or areas on either the burner casing or the turbine stator or rotor during operation of the power plant.

It is a further object of the invention to provide such a gas turbine power plant including highly efficient means for cooling the turbine rotor and stator which permit the combustion gases to be used at a relatively high temperature.

It is a further object of the invention to provide such a gas turbine power plant having novel means for lubricating the rotating shaft of the power plant.

It is a further object of the invention to provide such a gas turbine power plant having improved means for silencing the noise which is usually inherent in the operation of such power plants.

It is a further object of the invention to provide such a gas turbine power plant having novel means for balancing the thrust on the main shaft bearing.

It is a further object of the invention to provide such a gas turbine power plant having novel bearing means for journalling the rotating shaft which supports the turbine rotor and compressor impeller, the means being such that the critical speeds, i.e. the speeds at which maximum amplitude oscillations occur, and oscillations of the shaft are controlled and such as to permit dynamically balancing before the shaft is installed in the power plant and which eliminates the need for dynamic balancing after the shaft is installed in the power plant without the need for match marking the parts.

It is a further object of the invention to provide such a gas turbine power plant which is so constructed that it can be readily assembled and disassembled to facilitate maintenance.

It is a further object of the invention to provide such a gas turbine power plant which has novel means for directing the air and combustion gases.

Basically, the gas turbine power plant comprises a compressor, a burner and a turbine positioned between the compressor and burner. Air is drawn by the compressor impeller through a sound absorbing passageway and is then passed axially through a heat exchanger surrounding the turbine to a burner. The burner provides a continuously rotating fuel spray at a predetermined speed such as to prevent the creation of hot spots on various areas of the power plant. The gases of combustion are directed axially from the burner through the turbine and thereafter around the turbine and radially outwardly through the heat exchanger.

In the drawings:

FIG. 3 is a fragmentary part sectional view of the burner nozzle assembly.

FIG. 4 is a fragmentary sectional view taken along the line 4—4 in FIG. 3.

FIG. 5 is a fragmentary sectional view of the heat exchanger on an enlarged scale taken along the line 5—5 in FIG. 1.

FIG. 10 is a fragmentary view on an enlarged scale of a portion of the power plant shown in FIG. 1.

*General Construction*

Figure 1:
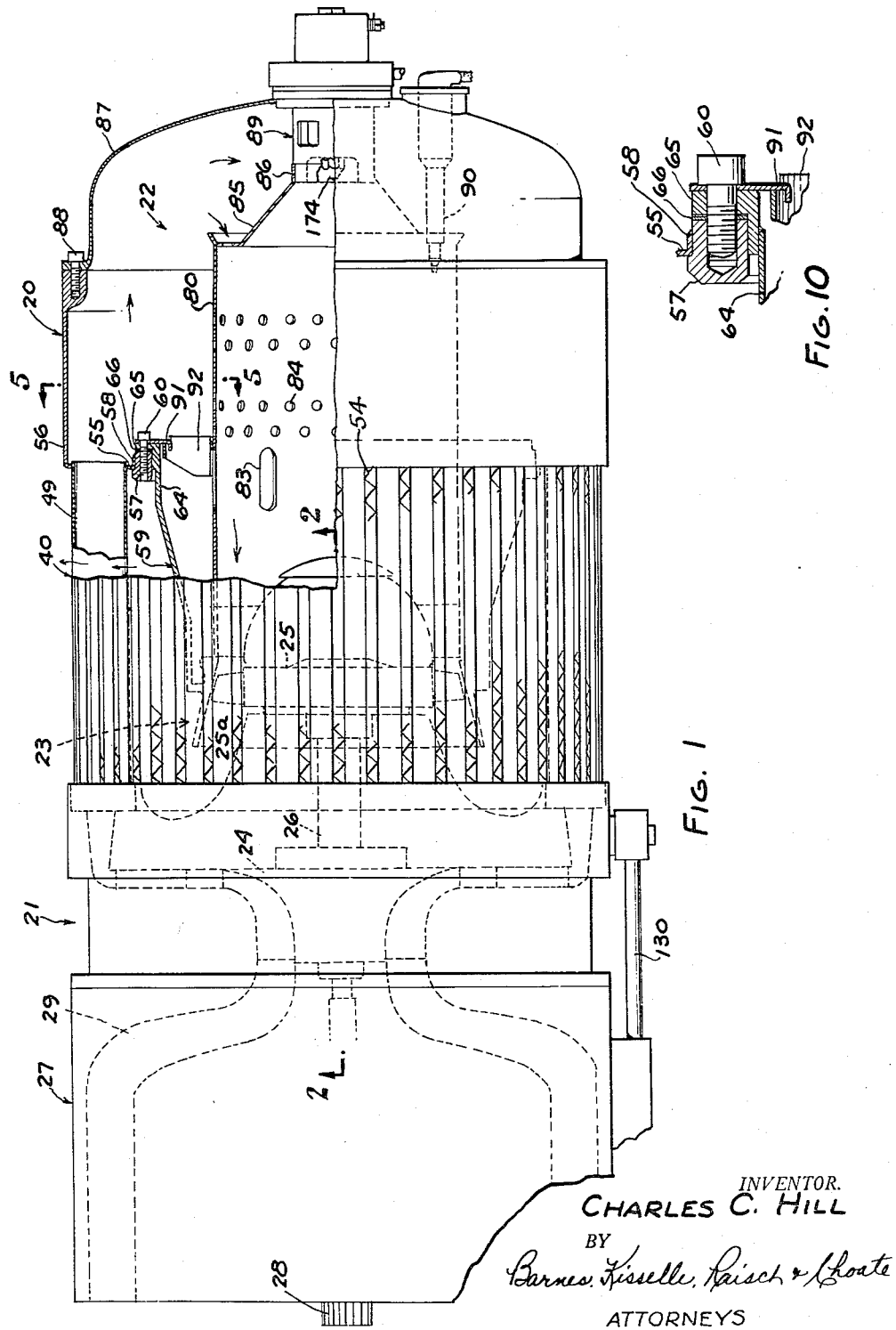
FIG. 1 is a fragmentary part sectional elevation of the gas turbine power plant made in accordance with the invention.

Referring to FIG. 1, power plant 20 embodying the invention comprises a compressor generally designated 21 which draws air from the atmosphere through an axial intake chamber 29 in housing 27. Air flows axially from compressor 21 through a heat exchanger 40 surrounding a turbine 23 to a burner 22 as more fully described below. The air is mixed with fuel in burner 22 and the gases of combustion pass from burner 22 to the turbine 23. The exhaust gases from turbine 23 pass radially outwardly through heat exchanger 40 and are exhausted to the atmosphere. Compressor impeller 24 and turbine rotor 25 are fixed on a shaft 26 which provides a drive to reduction gearing in housing 27 at one end of the power plant which, in turn, provides power to an output shaft 28.

Figure 2:
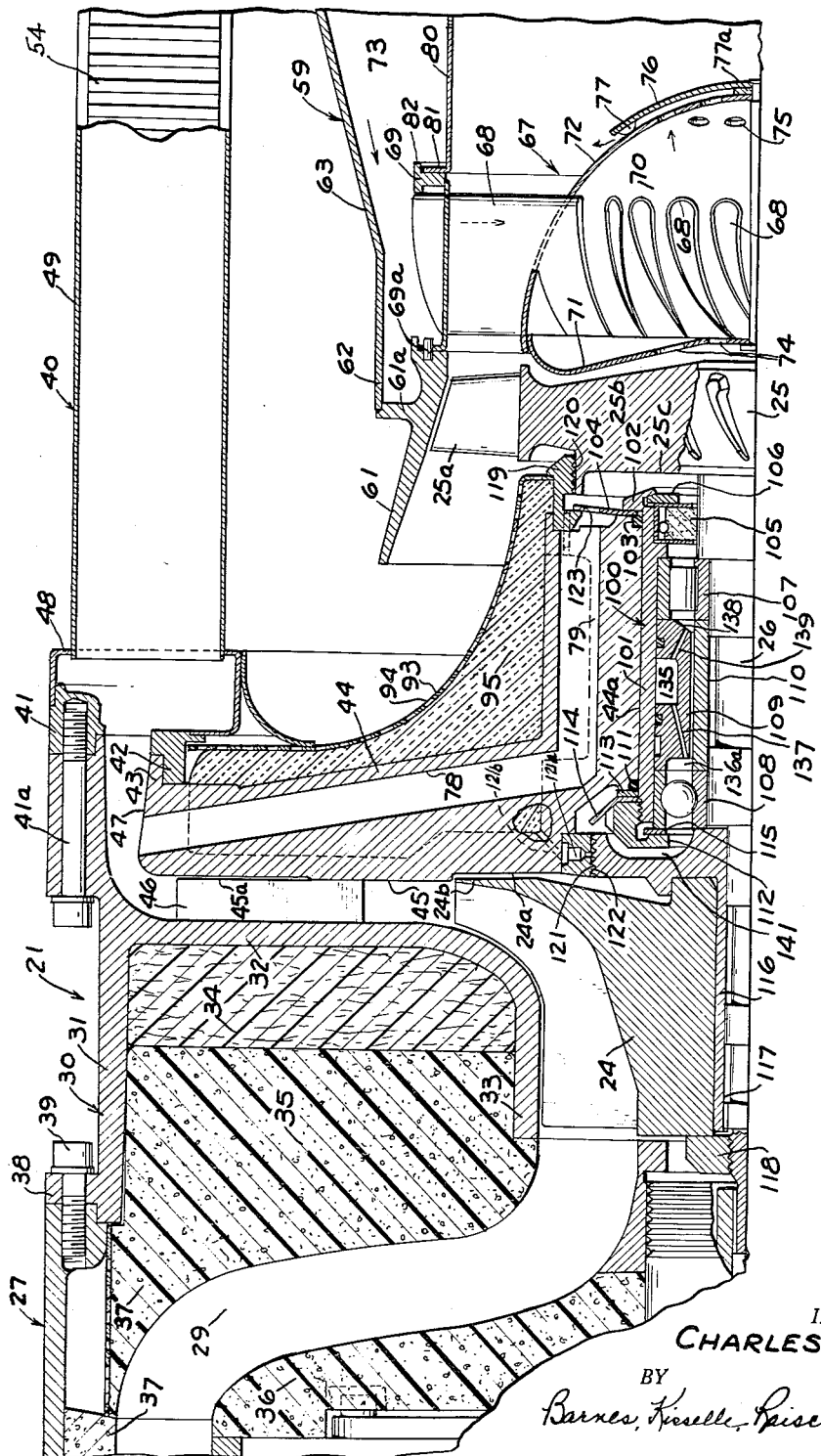
FIG. 2 is a fragmentary sectional view on a relatively enlarged scale taken along the line 2—2 in FIG. 1.

Housing 27 is generally cylindrical. Compressor 21 includes a shroud 30 which is bolted to one end of the housing 27. As shown in FIG. 2, shroud 30 includes an outer cylindrical web 31, a radial web 32 extending inwardly from intermediate the edges of cylindrical web 30 and an inner cylindrical web 33 extending axially from the inner end of the radial web 32. In this manner, shroud 30 provides an annular space which faces the annular chamber 29. This annular space is filled with sound absorbing material. As shown in FIG. 2, the material 34 nearest the web 32 is preferably of such a type as to withstand high temperatures, such as glass fibers, while the material 35 adjacent the annulus 29 is of the high sound absorbing type such as foamed plastic, preferably of the polyurethane ester type. Foamed plastic material is also provided around the inner and outer sides of the annular chamber 29 as at 36, 37 to absorb and dissipate the noise. The exposed surfaces of the materials 35, 36, 37 are shaped to form an annular passageway to the impeller 24 of the compressor. A flange 38 on one end of the cylindrical web 31 abuts the edge of the housing 27 and bolts 39 are threaded into the housing 27 to hold the compressor shroud 30 in position on the housing 27.

The use of a foamed plastic to form the sides of the annular chamber 29 permits the sides of the chambers to be readily formed to the desired configuration. Foamed plastic materials such as polyurethane esters are resistant to erosion and deformation due to movement of the air at high speeds through channel 29 in addition to being effective in absorbing sound caused either by movement of the air through the channel 29 or sound caused from the turbine proper.

The foamed plastic is light in weight and withstands deterioration when exposed to oil or water. In addition, it is low in cost and may be foamed in place so that no fastenings are required. The elimination of the fastenings not only reduces the cost but in addition results in a greater safety because there is no danger of the fastenings becoming loose and passing into the impeller 24. Elimination of fastenings also reduces the cost of assembly.

Heat exchanger assembly 40 is mounted on the other end of the cylindrical web 31 of shroud 30 and includes a ring 41. Bolts 41a extend axially through a flange on web 31 and are threaded into ring 41. Ring 41 is connected to a pilot flange 42 by a toroidal manifold 48. Flange 42 engages with a flange 43 on a bearing housing 44 and holds the bearing housing 44 in concentric relation to the compressor shroud 30. As further shown in FIG. 2, bearing housing 44 includes a surface 45 which extends radially in spaced parallel relationship to the adjacent surface of the radial web 32 of the compressor shroud 30. In addition, integral curved diffuser vanes 46 extend from radial web 32 axially into contact with the adjacent surface 45 of bearing housing 44. In practice, a slight clearance 45a on the order of 0.004 inch is provided on the surface 45 of bearing housing 44 to insure contact of the radially innermost portion of vanes 46 with surface 45 when bolts 41a are tightened. This insures a rigid mounting of housing 44 on compressor shroud 21. These diffuser vanes serve to decrease the velocity and increase the pressure of the air leaving the impeller 24. The outer peripheral surface 47 of the bearing housing 44 is spaced from the radially inner surface of the web 31 to provide an axial diffusing passageway which communicates with the space between the surface 45 and the web 32 and further decreases the velocity of the air.

Hollow toroidal manifold 48 is mounted on the ring 41 and welded or brazed thereto to provide a manifold into which the air is directed from the axial passageway between web 31 and peripheral surface 47. This passage is unobstructed by bolts or other fastening devices. A plurality of tubes 49 (FIG. 5) are mounted at one end of manifold 48 with the interior of the tubes communicating with the manifold. As shown in FIGS. 2 and 5, the tubes 49 are arranged circumferentially around manifold 48 and extend axially thereof. The cross section of each tube preferably comprises generally radially inwardly extending sides 50, 51 and opposed circumferentially extending ends 52, 53. Sides of adjacent tubes 49 are parallel. Corrugated strips 54 are provided between the tubes. Each strip 54 is corrugated in a radial direction, (FIGS. 1 and 2). The exhaust gases from the burner 22 pass between the tubes 49 through the strips 54 and thereby transfer heat to the air passing through the tubes 49 as presently described.

As shown in FIG. 2, bearing housing 44 supports a baffle 93 which directs the exhaust gases from turbine rotor 25 to the area adjacent tubes 49. Baffle 93 is provided with perforations 94 and sound absorbing and heat insulating material 95 such as refractory fibers is positioned behind baffle 93.

The compressor impeller 24, turbine rotor 25 and the shaft 26 are rotatably mounted in the bearing housing 44 in a manner presently described.

As shown in FIG. 1, the ends of the tubes 49 opposite manifold 48 extend through a radial end wall 55 of a cylindrical shell 56 and passes the air through tubes 49 into the cylindrical shell 56. A ring 57 is fastened to a flange 58 around the inner periphery of wall 55 and a turbine shroud assembly 59 is mounted on the ring 57 by bolts 60.

As shown in FIG. 2, shroud assembly 59 includes a frusto-conical portion 61 surrounding the outer ends of the blades 25a on the turbine rotor 25, a first cylindrical portion 62 fastened at one end of a radial flange 61a on portion 61, an integral conical portion 63 extending from the opposite end of the cylindrical portion 62 and a second cylindrical portion 64 extending from the conical portion 63 (FIG. 1). Turbine shroud assembly 59 also includes a flange 65 on the end of portion 64 which engages the ring 57 and through which bolts 60 extend (FIG. 1).

Shims 66 may be provided between the flange 65 and the ring 57 to accurately position the frusto-conical portion 61 of turbine shroud assembly axially relative to the rotor 25 and thereby control the spacing between the outer end of the rotor blades 25a and the inner surface of the frusto-conical portion 61.

Turbine shroud assembly 59 also supports turbine stator assembly 67 which directs the combustion gases from burner 22 to the blades of rotor 25. Stator assembly 67 includes a plurality of circumferentially spaced hollow stator vanes 68 which cooperate to form nozzles. As shown in FIG. 2, the outer ends of the stator vanes 68 are fixed to a mounting ring 69 and the inner ends extend into a chamber 70 which is defined by a generally radially extending wall 71 and a hemispherical wall 72. The inner ends of stator vanes 68 are preferably free to move radially relative to wall 72. By this arrangement, air from the compressor 21 is supplied through the vanes 68 in a direction radially inwardly from the space 73 within turbine shroud assembly 59 and into chamber 70 to cool the stator vanes. Radial wall 71 is provided with openings 74 which permit some of the air to pass from the chamber 70 onto the adjacent side of the rotor 25 and thereby cool the rotor hub 25b. Hemispherical wall 72 is formed with openings 75 through which some of the air may pass. A baffle 76 having indentations 77 and a spacer 77a thereon which space the baffle 76 from the outer surface of the wall 72 redirects this air along the outer surface of the wall 72 so that it cools the outer surface of wall 72 and passes in a thin film against the rim of rotor hub 25b and the root of blades 25a to cool them. Air is also supplied to cool the other side 25c of the rotor hub 25b by radial passages 78 and axial passages 79 in the bearing housing 44 as presently described.

One or more pilot pins 69a may be provided between the nozzle mounting ring 69 and turbine shroud assembly 59 to prevent rotation of the stator assembly 67 due to the reaction of the combustion gases on the stator vanes 68.

Referring to FIGS. 1 and 2, a generally cylindrical flame tube 80 is provided in the power plant and has its inner end formed with a flange 81 engaging but unattached to the end of mounting ring 69 and piloted therein by a lip 82 on ring 69. Flame tube 80 is supported in position by clips 91 held in place on ring 57 by bolts 60 (FIG. 5). Each clip 91 engages a retainer loop 92 mounted on the exterior of tube 80 intermediate its ends. Flame tube 80 is formed with a plurality of openings 83, 84 which permit air from the compressor to pass from the shell 56 radially inwardly into the tube. A generally frusto-conical member 85 telescopes into the outer end of tube 80 and centers the outer end of tube 80. Member 85 is formed at its outer end with an axial opening 86. The outer end of shell 56 is closed by a dished and flanged head 87 which is fixed to the end of shell 56 by bolts 88. Dished head 87 supports a fuel nozzle assembly 89 and an igniter 90. Fuel nozzle assembly 89 extends into the open outer end of member 85 and provides a rotating spray of fuel to the interior of the flame tube 80, as presently described.

*Shaft Mounting Structure*

Referring to FIG. 2, the hub 25b of turbine rotor 25 is preferably made an integral part of the shaft 26 which is rotatably mounted in the axial bore 44a of bearing housing 44 by a bearing assembly 100. Bearing assembly 100 comprises a cylindrical sleeve 101 having a radial flange 102 on one end thereof adjacent rotor 25 which overlaps the end of the central hub of bearing housing 44. An O-ring 103 is positioned in a groove in bore 44a of housing 44 adjacent sleeve 101 and a Belleville washer 104 is interposed between the flange 102 and the end of the hub of bearing housing 44. A seal is provided between the sleeve 101 and shaft 26 at one end of the cartridge by a segmental carbon type seal ring 105 held in position by a snap ring 106. A roller bearing 107 is interposed between the one end of the sleeve 101 and the shaft 26 and engages a shoulder on the sleeve 101 and a shoulder on the shaft 26. A ball bearing 108 is provided at the other end of the sleeve 101 and an oil manifold 109 and manifold spacer 110 are positioned between the bearings 107, 108.

An O-ring 111 is provided on the other end of the sleeve 101 and is seated in a groove in the opposite end of the bore 44a of bearing housing 44. A lock nut 112 holds the bearing assembly 100 in position in bore 44a of bearing housing 44. A washer 113 and lock washer 114 are interposed between nut 112 and the other end of the hub of bearing housing 44. In addition, a washer 115 is interposed between nut 112 and the other race of bearing 108. The dimensions are such that when the lock nut 112 is tightened against washer 115 an axial clearance of several thousandths exists between spring washer 104 and the end of bearing housing 44.

The impeller 24 is press fitted on a bushing 116 which is formed with a spline connection 117 which engages a spline on a reduced portion of shaft 26. A lock nut 118 is threaded on the shaft 26 and engages one end of the impeller 24 to hold the impeller 24 and the inner races of bearings 107, 108 and manifold spacer 110 in position on the shaft.

A slight radical clearance is intentionally provided be-between the bearing housing 44 and sleeve 101, on the order of 0.002 inch, in order to provide some permissible radial motion between the bearing assembly and the bearing housing 44. O-rings 103, 111 thus act as spring supports for the sleeve 101 and in turn the bearing assembly on bearing housing 44. The engagement of the washers 104, 113 with the ends of the hub of housing 44 provide a frictional damper because of the metal to metal contact which damps any radial oscillations of the bearing assembly relative to bearing housing 44 at critical speeds of rotation. The O-rings 103, 111 provide a resilient mount which reduces the critical speed of rotation below the operating speed of the turbine. The O-rings 103, 111 also act as non-linear springs, that is, become more stiff with increased load and therefore provide a progressively greater resistance to oscillations as the rings are loaded.

Labyrinth type seals are provided between the bearing housing 44 and the turbine rotor 25 and compressor impeller 24. Labyrinth seal member 119 on one end of the bearing housing 44 cooperates with a sealing surface 120 on turbine rotor 25 to provide a seal. A sealing member 121 on the other end of the bearing housing 44 cooperates with a labyrinth seal surface 122 on the bushing 116 to form a seal on the other end of the bearing housing 44. A vent 121a in member 121 communicates with passage 121b in housing 44 to vent the labyrinth seal to the insulation 95.

Passages 78 in the bearing housing 44 exetnd generally radially inwardly from the outer periphery 47 of the member 44 and communicate with axial passages 79 which extend axially from the inner end of the passage 78 to the end of the bearing housing 44 which is adjacent turbine rotor 25. In this manner, air adjacent the periphery of the bearing housing 44 passes through the passages 78, 79 and openings 123 in washer 104 into contact with surface 25c of turbine rotor hub 25b to cool the rotor hub.

Referring to FIG. 2, the pressure of air and gases on the compressor rotor 24 tends to cause an axial thrust on shaft 26 to the right as shown in FIG. 2. This is counteracted by the pressure of the air exhausted from impeller 24 on the portion of the impeller 24 which extends between the labyrinth seal 121, 122 to the periphery of the impeller 24, generally designated as 24a (FIG. 2). Since the unit pressure of air on the left of impeller 24 varies from the center to the periphery and the unit pressure of air on the right, 24b, of impeller 24 is substantially equal to the impeller output unit pressure, the net thrust on impeller 24 is generally to the left. In addition, the pressure of gases and air on the turbine rotor 25 tends to cause a thrust on the shaft to the left as shown in FIG. 2. This, in turn, is counteracted by the pressure of air from impeller 24 communicating through passages 78, 79 and acting on surface 25c of the turbine hub 25b which extends radially inwardly from the labyrinth seal 119, 120. The pressure from compressor 24 has been increased by diffusers 46 which convert some of the kinetic energy of the air from compressor 21 to pressure energy. By varying the diameter of the labyrinth seals 121, 122 and 119, 120 it is possible to vary the areas of the counteracting thrust on the impeller 24 and rotor 25, respectively, and thus either balance the total thrust or cause the thrust to be in one direction or the other, that is, to the right or left as viewed in FIG. 2.

*Shaft Lubricating System*

Figure 6:
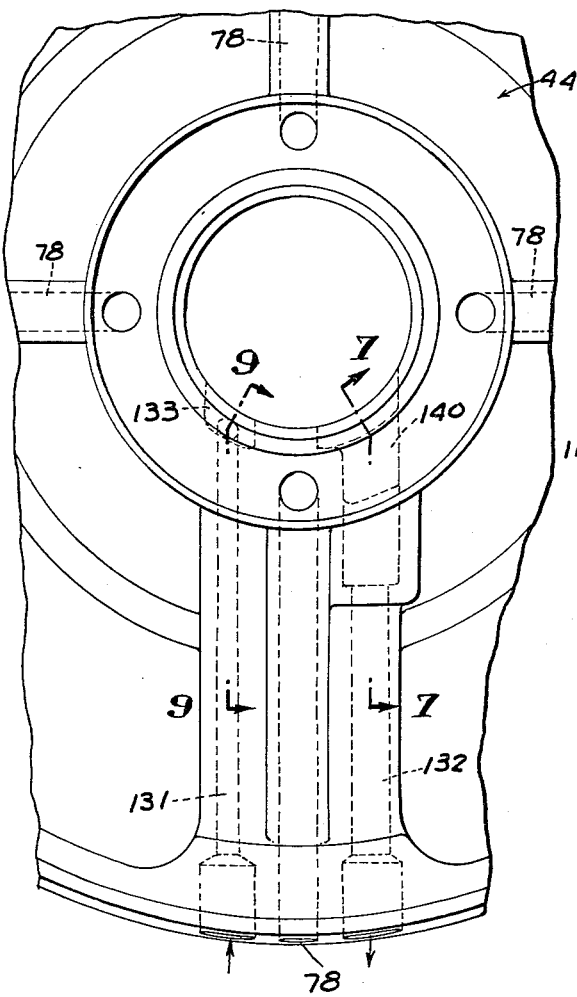
FIG. 6 is a fragmentary end elevation of a portion of the shaft mounting and lubricating structure.
Figure 7:
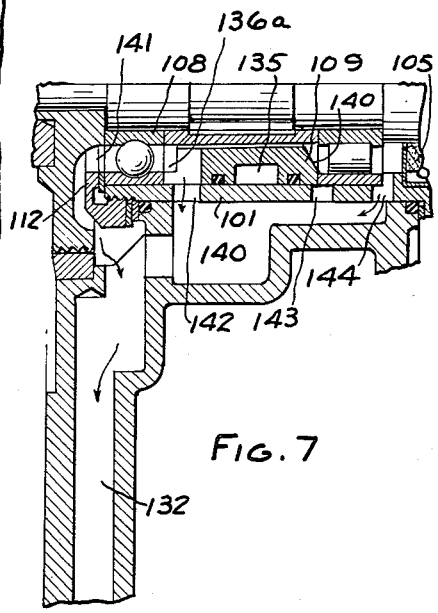
FIG. 7 is a fragmentary sectional view taken along the line 7—7 in FIG. 6 showing further details of the shaft mounting and lubricating structure.
Figure 9:
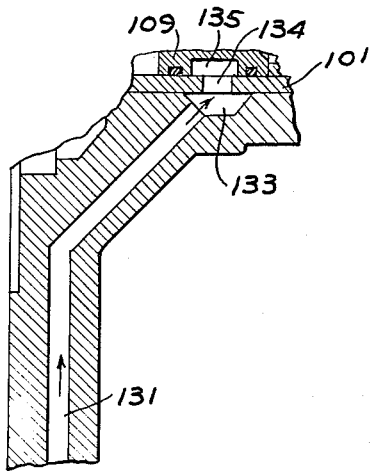
FIG. 9 is a fragmentary sectional view taken along the line 9—9 in FIG. 6.
Figure 8:
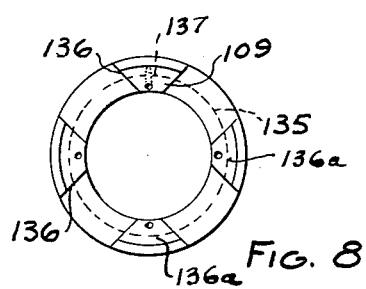
FIG. 8 is an end view of an oil port manifold utilized in the apparatus shown in FIG. 7.

A system is provided for lubricating the shaft 26 and the bearing assembly 100. Oil from a pump in the gear housing 27 is forced under pressure through passages in the bearing housing 44 to the shaft 26 and bearing assembly 100. As shown in FIG. 1, oil passes from a pump (not shown) driven by shaft 26 through a line 130 to the bearing housing 44. The oil is returned through a similar line (not shown) from the bearing housing 44 to the reservoir for the oil. As shown in FIG. 6, bearing housing 44 is formed with a radially extending inlet passage 131 and a radially extending outlet passage 132. The inner end of inlet passage 131 communicates with a groove 133 adjacent the sleeve 101. Sleeve 101 is formed with openings 134 providing communication between the groove 133 and an annular groove 135 in the outer surface of the oil manifold 109 (FIG. 7). Oil manifold 109 is cylindrical and is formed with circumferentially spaced radial slots 136 at the end thereof nearest the ball bearing 108 (FIG. 2). The last mentioned end is counterbored so that the areas between the slots are formed with shoulders 136a spaced axially inwardly from the end of manifold 109. Passageways 137 extend generally axially from the shoulders to annular groove 135. The other end of manifold 109 is beveled radially and axially inwardly as at 138 and passageways 139 extend axially from the beveled surfaces 138 to annular groove 135. The oil entering through inlet 131 passes to the annular groove 135 and thereafter through passages 137, 139 to the area of the bearings 108, 107. Outlet passage 132 in bearing housing 44 communicates with a manifold area 140 which in turn communicates with the area of the bearings through openings 141, 142, 143 and 144 to permit a continuous return circulation of the lubricating oil.

*Fuel Nozzle Structure*

The burner nozzle structure is adapted to provide a symmetrical fuel spray to flame tube 80 in order to prevent hot spots on the flame tube 80 and turbine stator 68 and turbine rotor blades 25a which ordinarily occur because of the unsymmetrical temperature distribution of the fuel spray. Such hot spots cause thermal stresses which result in cracks, fractures and similar failures. It is well known that even in carefully manufactured fuel nozzles a substantial degree of assymmetry exists. This assymmetry is further accentuated by the build up of carbon deposits and wear in use.

Basically, in the burner nozzle structure embodying the invention, the fuel nozzle is rotated at a controlled speed such that any portion of the spray will not be in contact with the flame tube, turbine stator or turbine rotor blades for a period of time greater than the period required for that portion to achieve a certain temperatrue change.

As shown in FIGS. 3 and 4, the fuel nozzle structure comprises a mounting ring 150 welded in an opening in the burner head 87 and having a generally cylindrical and axially inwardly extending manifold 151. A swirler 152 having a peripheral flange 153 is mounted on the ring 150. A fuel nozzle shaft 154 is in turn mounted in an annular groove 155 on the swirler 152. A fuel distributor block 156 is mounted adjacent the outer surface of the swirler 152 and fuel nozzle shaft 154 and held in position by bolts 157 extending through flange 153 on swirler 152 into the ring 150. Fuel under pressure is provided from a pump (not shown) in the gear housing 27 to passage 158 in the distributor block 156 and flows from the passage through opening 159 into a chamber 160.

In operation, the fuel flows through an axial opening 161 in fuel nozzle shaft 154. When the gas turbine is not in operation, the end of the opening 161 is closed by a member 162 having a seal 162a on the end thereof and is yieldingly urged against the end of the shaft by a spring 163. A solenoid 164 surrounds member 162 and when energized moves member 162 outwardly away from the end of the shaft 154 against the action of the spring 163 to permit the fuel to flow through shaft 154. An O-ring 165 provides a liquid tight seal between the flange 166 on the shaft 154 and the face of the distributor block 156.

The inner end of a swirler 152 is provided with a plurality of circumferentially spaced radially extending swirler vanes 168 which direct the air passing through openings in manifold 151 into contact with vanes 169 on the periphery of a member 170 which is rotatably mounted on the shaft 154. The angular relationship and shape of the vanes 168, 169 is such that a turbine is created operating the members 170 over a predetermined range of speeds. A graphite bushing 171 is press fitted into the interior surface of the member 170 and is in rotating contact with the exterior of the shaft 154. The member 170 and bushing 171 form a single unit. A needle thrust bearing 172 is provided adjacent the end of bushing 171 and the member 170. Bushing 171 and bearing 172 are held against axial movement by a snap ring 173. A fuel spray nozzle 174 of conventional type is threaded into an adapter plug 175 which in turn is fixed on member 170.

Fuel which may leak past graphite bushing 171 collects on the inner surface of swirler 152 and flows into the area of the vanes where it is directed inwardly into the flame tube by the air.

According to the invention the vanes are so designed that the fuel nozzle 174 is rotated at a speed substantially less than the speed of rotation of the turbine rotor 25 so that any particular portion of the spray will not be in contact with a portion of the turbine rotor blades 25a for a greater period than the period required for that portion of the rotor blades 25a to achieve a certain temperature beyond which undesirable hot spots would be produced on the blades. At the same time, the vanes are so designed that the fuel nozzle 174 will be rotated at a speed sufficiently great so that no portion of the spray is in contact with the stator vanes 68 or flame tube 80 for a greater period than the period required for that portion of the stator vanes 68 or flame tube 80 to achieve a certain temperature beyond which undesirable hot spots would be produced. This period will of course depend upon the nature and thickness of the material. I have found it preferable to have the speed of rotation of the fuel nozzle 174 be less than one-tenth the speed of rotation of the turbine rotor 25 and preferably such that any portion of the fuel spray is in contact with any portion of the stator vanes 68 or flame tube 80 for a period less than one-tenth the time required for the thinnest portion of the stator vanes 68 or flame tube 80 to respond to a certain temperature change.

For example, if in a particular turbine, the maximum polar temperature gradient of the fuel spray is ±300° F., that is, the temperature of the burning fuel varies 600° F. circumferentially, and the flame tube responds to 600° F. temperature change in a time $t$; then the fuel spray must be rotated so that no portion of the burning fuel spray is in contact with a portion of the flame tube for a time $t$, and preferably so that the contact time is substantially less, say 0.10 $t$.

By this arrangement, the danger of hot spots or areas on the turbine rotor or on the burner tube or stator vanes due to assymmetry in the fuel distribution is entirely eliminated.

It should of course be understood that other means may be provided for rotating the fuel nozzle 174, provided that such means can be accurately controlled to rotate the nozzle at the desired speed.

In addition to rotating the burner spray nozzle, the flow of air through the swirler vanes serves to prevent the deposition of carbon and the like on the inner surface of member 85 and to stabilize the combustion process by causing vortex flow and turbulence. To facilitate the vortex action, the vanes may be shortened providing a clearance between the tips of the vanes and manifold 151 so that some air may bypass the vanes.

Assembly

Assembly of the gas turbine power plant may be summarized as follows:

In assembly, compressor shroud 30, bearing housing 44, heat exchanger assembly 40 and shell 56 form a single unit. Bearing assembly 100 is first assembled on shaft 26 and the compressor impeller 24 is also mounted on the shaft. This entire sub-assembly is then dynamically balanced in its own bearings. Compressor impeller 24 is removed and the sub-assembly without impeller 24 of bearing assembly 100, turbine rotor 25 and shaft 26 are inserted in the bearing housing 44 after which the compressor impeller 24 is again mounted on the shaft 26 in the same angular position as when balanced as by a key or spline. Since the entire sub-assembly including the turbine rotor 25, shaft 26, bearing assembly 100 and impeller 24 have been previously dynamically balanced and angular relationship is not disturbed during assembly, it is not necessary to again balance these units when they are mounted in bearing housing 44.

Bearing housing 44 is then brought into position adjacent heat exchanger 40 with flange 42 of heat exchanger 40 in engagement with flange 43 of bearing housing 44 to thereby center the bearing housing 44 relative to the heat exchanger. This assembly is then brought into position and mounted on compressor shroud 30.

Turbine shroud 59 is then mounted in position and the turbine stator assembly 67 is inserted in position adjacent the turbine rotor 25. Shims 66 may be provided as required to provide the proper clearance between the outer ends of turbine rotor blades 25a and frusto-conical portion 61 of the turbine shroud 69.

Before fastening all the bolts 60, flame tube 80 is slipped into position and the clips 91 are provided on some of bolts 60 to engage the retaining loops 92 and hold the tube 80 in position. Head 87 is then mounted on the other end of the shell 56. The fuel nozzle structure is mounted on head 87 before or after head 87 is mounted on shell 56. Finally, ignitor 90 is fastened to head 87.

The connection between the gear housing 27 and compressor shroud 30 may be made at any time before or after turbine rotor 25, shaft 26 and impeller 24 have been mounted in bearing housing 44.

Operation

The operation of the gas turbine power plant may be summarized as follows:

In order to start the gas turbine power plant, a starter in the housing 27 is energized electrically to rotate the shaft 26. This operates a fuel pump (not shown) and after the fuel pressure reaches a predetermined value, about 40 p.s.i., fuel solenoid 164 is energized and ignitor 90 is also energized. Operation of the starter causes air to be drawn into and from the compressor 21 to the burner 22 where it is mixed with fuel and ignited by the ignitor 90. The combustion gases then pass to the turbine 23 and operate on the turbine rotor 25 to rotate shaft 26. After combustion has begun, the starter and ignitor are de-energized and combustion continues with resultant operation of the power plant.

In operation, air is drawn by the compressor impeller 24 from the exterior through annular chamber 29 in housing 27 and is compressed and directed radially outwardly between surface 45 of bearing housing 44 and the adjacent surface of web 32 (FIG. 2). The velocity of the air is partially converted to pressure by diffuser vanes 46. The air then passes through the axial passageway between the end of bearing housing 44 and the web 31 where it is further diffused and flows to the manifold 48 through the tubes 49 to the shell 56 (FIG. 1). The air then flows radially inwardly. The major portion of the air passes through the openings 84 in burner tube 80 and is mixed with the fuel emanating from nozzle 174 and the mixture is burned. Another portion of the air passes through openings 83 to cool or quench the combustion gases to the desired operating temperature. A portion of the air passes through the manifold 151 and causes the nozzle 174 to be rotated to provide a whirling spray of fuel. Another portion of the air passes axially between the turbine shroud 59 and tube 80 through the stator vanes 68 to cool the stator vanes (FIG. 2). This air subsequently flows outwardly through opening 74 in wall 71 to cool one side of the turbine rotor hub 25b and also through openings 75 in spherical wall 72 and along baffle 76 to cool the rim of wall 72 and the turbine rotor 25.

The gases of combustion in flame tube 80 are directed by the stator vanes 68 against the blades on the turbine rotor 25 and then are exhausted axially. Baffle 93 redirects the exhaust gases approximately 180° into the area between the shroud 59 and the tubes 49 and the exhaust gases then pass radially between the tubes 49 into contact with the corrugated strips 54 (FIG. 5) so that some of the heat of the exhaust gases is transferred to the air passing through the tubes 49.

Air from the compressor impeller 24 is also passed through passageways 78, 79 to the other side of the turbine rotor to thereby cool the turbine rotor and assist in balancing the thrust.

While the operation of the power plant continues, the rotation of the fuel nozzle 174 at a speed substantially less than the speed of rotation of the rotor 25 insures that synchronous hot spots will not be formed on the turbine rotor blades 25a. At the same time, since the the speed of rotation of the nozzle is such that no region of the spray and resultant combustion gases contacts the stationary parts for a time greater than the time required for a predetermined temperature differential to occur, hot spots will not be formed on the stationary parts.

During the operation of the power plant, lubricating oil is continuously pumped from the pump in the gear box housing 27 to the inlet 131 and the associated passages to the bearings 107, 108. From the area around the bearings, the oil flows to outlet passage 132 and back to the reservoir. In this manner, a complete lubrication and cooling of the bearings is achieved.

By providing insulating material 34, 35 and 36 adjacent the inlet of the compressor and insulating material 95 adjacent the outlet of the turbine substantial reduction in noise is achieved providing for a more quiet operation of the gas turbine power plant.

A typical gas turbine power plant embodying the invention has the following general specifications:

| | |
|---|---|
| Power rating | 75 horsepower. |
| Output shaft speed | 3600 r.p.m. |
| Turbine shaft speed | 50,000 r.p.m. |
| Length | 39.60 inches. |
| Diameter | 14.0 inches. |
| Weight | 125 lbs. |
| Fuels | Diesel, kerosene, fuel oil, jet fuel or gasoline, liquified petroleum gases and natural gases. |
| Compressor pressure ratio | 3.0–1. |
| Turbine inlet temperature | 1500° F. |
| Air flow | 2.2 lbs./sec. |

It can thus be seen that I have provided a gas turbine power plant which is light in weight and compact and efficient. The simplicity of design permits the power plant to be constructed at a relatively low cost as compared to the cost of prior gas turbine power plants. The construction of the power plant not only results in savings in cost of manufacture but in addition in asembly and maintenance. The novel cooling arrangement permits the combustion gases to be used at a relatively high temperature. The improved silencing means results in a relatively quiet operation. The use of the novel fuel nozzle construction permits the various parts of the device to be made of relatively light weight material since hot spots are entirely avoided. This also prolongs the life of the turbine parts.

I claim:

1. In a gas turbine power plant comprising a compressor having an impeller and a turbine having a rotor mounted for rotation about the same axis as the impeller, said power plant having a circumferential exhaust passageway spaced radially outwardly from the turbine rotor, the combination comprising a burner, said turbine rotor being positioned between said impeller and said burner, means for directing a stream of air in a path substantially annular in cross section axially from said compressor to said burner, means for directing the products of combustion from said burner in a path substantially annular in cross section axially in the opposite direction to said turbine, said exhaust passageway circumferentially surrounding a portion of said last-mentioned means, means for directing the exhaust gases from said turbine in a path substantially annular in cross section axially in said opposite direction, means for thereafter reversing the flow of said exhaust gases in a reverse axial path surrounding said turbine rotor, and means for thereafter directing said exhaust gases radially outwardly to said exhaust passageway.

2. The combination set forth in claim 1 including means for directing a secondary stream of air from said compressor without passing through the exhaust passageway or the burner and without substantial pressure drop to one side of said turbine rotor and means for directing another secondary stream of air from said compressor without passing through the burner to the other side of said turbine rotor to cool said turbine rotor.

3. The combination set forth in claim 1 including means for reversing the axial direction of flow of and diverting a portion of the air being directed axially to said burner to the side of said turbine rotor adjacent said burner without passing through said burner.

4. The combination set forth in claim 3 wherein said last mentioned means includes a plurality of circumferentially spaced, hollow, radial stator vanes of said turbine, the adjacent vanes cooperating to define turbine nozzles adjacent said turbine rotor for directing the combustion gases axially to said turbine rotor.

5. The combination set forth in claim 1 including a shroud circumferentially surrounding said turbine and extending axially beyond said turbine toward said burner.

6. The combination set forth in claim 5 including a heat exchanger positioned exteriorly of and surrounding said shroud throughout substantially the entire length of said shroud, said heat exchanger having means through which the air passes from the compressor toward the burner, and means through which said exhaust gases pass in heat exchange relationship to said air from said turbine.

7. The combination set forth in claim 5 wherein said burner includes an axial flame tube having a portion thereof extending into and spaced from the interior of said shroud to define an annular space between said tube and said shroud, means defining an enclosed chamber within said tube and adjacent the side of said turbine rotor nearest said burner, and a plurality of circumferentially spaced hollow stator vanes mounted adjacent said turbine between said turbine and said burner extending radially from said annular space to the interior of said chamber, said vanes cooperating with one another to direct the gases of combustion axially to said turbine whereby a portion of the air directed to said burner is diverted from said annular space radially inwardly through said radial vanes to thereby cool said vanes and direct air into the chamber.

8. The combination set forth in claim 7 wherein said chamber is provided with a plurality of openings adjacent said burner, and means for directing air after it has passed from said chamber through said openings along the external surface of said chamber to the roots of the blades of said stator and said turbine rotor.

9. The combination set forth in claim 5 including shim means for mounting said turbine shroud on said casing at selective positions longitudinally of said casing, said shroud having a frusto-conical portion surrounding the periphery of said turbine, whereby the tip clearance between the periphery of said turbine rotor and said frusto-conical portion may be varied by changing the thickness of said shim means.

10. The combination set forth in claim 9 including a turbine stator assembly mounted on said turbine shroud and movable longitudinally therewith, said stator assembly comprising a plurality of vanes for directing combustion gases to said turbine.

11. The combination set forth in claim 9 including a flame tube and means for supporting said tube on said turbine shroud with said shroud surrounding a portion of said tube.

12. The combination set forth in claim 1 including a compressor shroud, a bearing housing spaced axially from said compressor shroud and adapted to support the compressor shaft, a heat exchanger including an annular manifold, means for axially interengaging and mounting said heat exchanger on said compressor shroud, said heat exchanger and said bearing housing having annular interengaging flanges so that the bearing housing is supported by said heat exchanger in concentric relation thereto, and spacer means on one of said bearing housing and said shroud extending axially to the other of said bearing housing and said shroud and engaging said other of said bearing housing and said shroud.

References Cited in the file of this patent

UNITED STATES PATENTS

| | | |
|---|---|---|
| 869,868 | Spencer | Oct. 29, 1907 |
| 2,267,275 | Gevrnz | Dec. 23, 1941 |
| 2,350,784 | Lohner | June 6, 1944 |
| 2,540,902 | Moore | Feb. 6, 1951 |
| 2,553,867 | Parducci | May 2, 1951 |
| 2,587,057 | McVeigh | Feb. 26, 1952 |
| 2,602,292 | Buckland | July 8, 1952 |
| 2,684,196 | Wood | July 20, 1954 |
| 2,703,674 | Wood | Mar. 8, 1955 |
| 2,705,401 | Allen | Apr. 5, 1955 |
| 2,803,945 | Staaf | Aug. 27, 1957 |
| 3,011,311 | Williams | Dec. 5, 1961 |
| 3,015,937 | Giliberty | Jan. 9, 1962 |

FOREIGN PATENTS

| | | |
|---|---|---|
| 585,343 | Great Britain | Jan. 15, 1943 |
| 769,680 | Great Britain | Mar. 13, 1957 |
| 800,602 | Great Britain | Aug. 27, 1958 |